United States Patent
Ikeda

(10) Patent No.: US 8,814,534 B2
(45) Date of Patent: Aug. 26, 2014

(54) OIL SUPPLY APPARATUS FOR TRANSMISSION

(75) Inventor: Naoyasu Ikeda, Atsugi (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 117 days.

(21) Appl. No.: 13/227,081

(22) Filed: Sep. 7, 2011

(65) Prior Publication Data

US 2012/0063920 A1    Mar. 15, 2012

(30) Foreign Application Priority Data

Sep. 10, 2010    (JP) .................................. 2010-203709

(51) Int. Cl.
F04B 49/06    (2006.01)

(52) U.S. Cl.
USPC ........................... 417/212; 417/44.1; 417/213

(58) Field of Classification Search
USPC ........................ 417/44.1, 212, 213; 310/68 C
See application file for complete search history.

(56) References Cited

U.S. PATENT DOCUMENTS

| | | | | |
|---|---|---|---|---|
| 5,718,302 | A * | 2/1998 | Hasebe et al. | 180/65.6 |
| 7,779,958 | B2 * | 8/2010 | Kitano et al. | 180/339 |
| 2003/0171867 | A1 * | 9/2003 | Nakamori et al. | 701/54 |
| 2006/0120876 | A1 * | 6/2006 | Kitano et al. | 417/42 |
| 2008/0135314 | A1 * | 6/2008 | Motoike et al. | 180/65.2 |
| 2011/0135499 | A1 * | 6/2011 | Lee et al. | 417/44.1 |

FOREIGN PATENT DOCUMENTS

JP    2006-161851 A    6/2006
WO    WO 2009/037996 A1    3/2009

* cited by examiner

Primary Examiner — Peter J Bertheaud
Assistant Examiner — Dominick L Plakkoottam
(74) Attorney, Agent, or Firm — Foley & Lardner LLP

(57) ABSTRACT

Oil supply apparatus having an electric motor, an oil pump driven by the electric motor and supplying oil to a transmission, an oil temperature sensor detecting oil temperature, and a controller setting a drive torque value and controlling the electric motor so that the electric motor outputs a drive torque according to a detection oil temperature. The controller is configured to perform rotation speed control of the electric motor so that when judging that there is a possibility that the detection oil temperature and oil temperature close to the oil pump are different at electric motor starting, the electric motor rotates at a lower rotation speed than where the electric motor rotates by the drive torque value according to the detection oil temperature before performing the electric motor control by which the electric motor outputs the drive torque according to the detection oil temperature.

7 Claims, 5 Drawing Sheets

OIL SUPPLY APPARATUS FOR TRANSMISSION

BACKGROUND OF THE INVENTION

The present invention relates to an oil supply apparatus for a transmission, which supplies the oil to the transmission by an electric oil pump.

A transmission provided in a drive line of a vehicle performs shift change using oil (working fluid). An apparatus for supplying the oil to the transmission is therefore provided. To provide the oil to the transmission, a pump that pressurizes and discharges the oil is required. As the pump, there are a mechanical oil pump and an electric oil pump. The mechanical oil pump is a pump that is driven by an engine, and the electric oil pump is a pump that is driven by an electric motor.

The electric oil pump is able to supply the oil even in an engine stop state. Thus the electric oil pump is favorable for the oil supply to the transmission in a vehicle in which the so-called idling stop control that stops the engine when the vehicle stops is performed. Normally, the electric oil pump is provided in addition to the mechanical oil pump, then the oil supply is ensured using the engine-driven mechanical oil pump when the engine operates, and the oil supply is ensured using the electric oil pump when the engine stops.

Here, in a case of the electric oil pump, since the electric oil pump is driven by the electric motor, an oil discharge pressure from the oil pump depends on a pump drive torque of this electric motor. That is, in order to discharge the oil from the oil pump at a predetermined discharge pressure, the electric motor is controlled so as to output the pump drive torque according to this predetermined discharge pressure.

However, pressure of the oil discharged from the electric oil pump depends on viscosity of the oil. Further, the oil viscosity varies according to temperature of the oil. For this reason, for example, because the oil viscosity is high when the oil temperature is low, even if the electric motor drives the electric oil pump at the pump drive torque according to the predetermined discharge pressure, an actual discharge pressure does not reach the predetermined discharge pressure. In this case, in order to obtain the predetermined discharge pressure, it is required to increase the pump drive torque.

For this problem, Japanese Patent Provisional Publication No. 2006-161851 (hereinafter is referred to as "JP2006-161851") discloses a hydraulic supply device that operates an electric motor by giving a command to the electric motor with a pump drive torque to be outputted being a torque command value. In JP2006-161851, temperature of oil (working fluid) is detected by an oil temperature sensor, then by determining the torque command value in accordance with the detected oil temperature, the predetermined discharge pressure can be obtained.

SUMMARY OF THE INVENTION

However, in a case where the oil temperature sensor is widely separated from the electric oil pump, there may arise a difference between the oil temperature detected by the oil temperature sensor and an oil temperature close to the electric oil pump.

For instance, in a state in which the electric oil pump stops then the oil stops without oil circulation in an oil circuit, when an ambient temperature of the oil temperature sensor and an ambient temperature of the electric oil pump are different, the difference between the oil temperature by the oil temperature sensor and the oil temperature close to the electric oil pump arises.

Especially when the oil temperature of the electric oil pump is lower than the oil temperature detected by the oil temperature sensor, a torque shortage of the electric motor occurs in the operation by the torque command value according to the detected oil temperature. This makes it impossible to start the electric motor also impossible to perform proper control. Then a required discharge pressure can not be secured immediately, and it takes time to obtain the oil pressure required for the operation of the transmission.

For these problems, it is therefore an object of the present invention to provide an oil supply apparatus for the transmission which, even when the difference between the detected oil temperature and the oil temperature close to the electric oil pump exists, can obtain the discharge pressure of the electric oil pump surely and immediately.

According to one aspect of the present invention, an oil supply apparatus for a transmission comprises: an electric motor; an oil pump that is driven by the electric motor and supplies oil to the transmission; an oil temperature sensor that detects temperature of the oil; and a controller that sets a drive torque value and controls the electric motor so that the electric motor outputs a drive torque according to a detection oil temperature of the oil temperature sensor, and the controller is configured to perform an oil temperature difference-presence control that controls a rotation speed of the electric motor so that when the controller judges that there is a possibility that the detection oil temperature and temperature of the oil close to the oil pump are different at electric motor starting, the electric motor rotates at a lower rotation speed than a rotation speed of a case where the electric motor rotates by the drive torque value according to the detection oil temperature before performing the electric motor control by which the electric motor outputs the drive torque according to the detection oil temperature.

According to another aspect of the invention, a method for controlling oil supply to a transmission in a vehicle, the vehicle has the transmission, an electric motor, an oil pump driven by the electric motor and supplying oil to the transmission and an oil temperature sensor detecting temperature of the oil, the method comprises: setting a drive torque value and controlling the electric motor so that the electric motor outputs a drive torque according to a detection oil temperature of the oil temperature sensor; and controlling a rotation speed of the electric motor so that when judging that there is a possibility that the detection oil temperature and temperature of the oil close to the oil pump are different at electric motor starting, the electric motor rotates at a lower rotation speed than a rotation speed of a case where the electric motor rotates by the drive torque value according to the detection oil temperature before performing the electric motor control by which the electric motor outputs the drive torque according to the detection oil temperature.

The other objects and features of this invention will become understood from the following description with reference to the accompanying drawings.

DETAILED DESCRIPTION OF THE INVENTION

Embodiments of the present invention will be explained below with reference to the drawings.
<System Configuration>
A system configuration of a main part of a vehicle will be explained with reference to FIG. 1.

Figure 1:
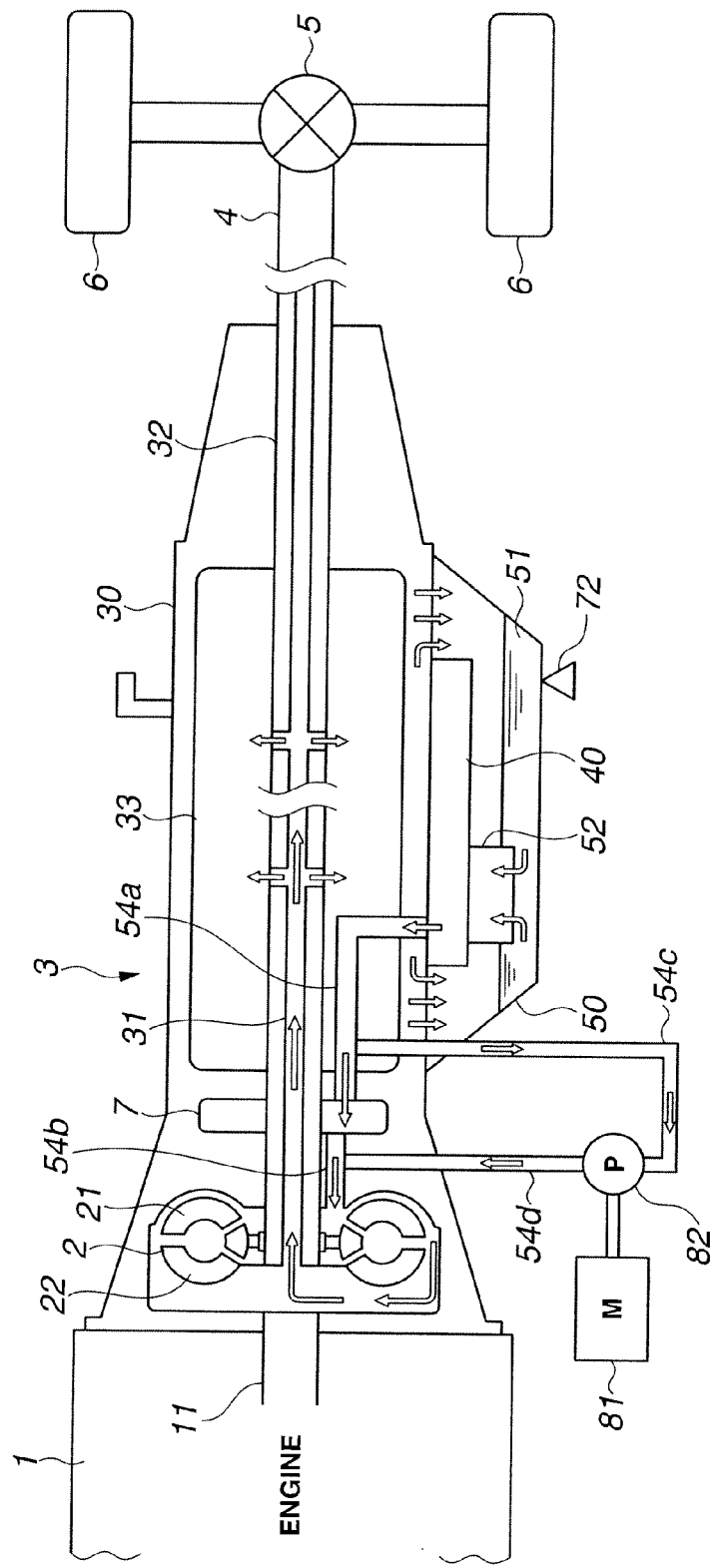
FIG. 1 is a system configuration diagram of a main part of a vehicle, for explaining an embodiment of the present invention.

As shown in FIG. 1, the vehicle according to the present embodiment has an engine 1 that is a drive source of the vehicle, an automatic transmission 3, and a torque converter 2 that is provided between an output shaft 11 of the engine 1 and an input shaft 31 of the automatic transmission 3 and has a pump 21 at an input side and a turbine 22 at an output side. An output shaft 32 of the automatic transmission 3 is connected to right and left driving wheels 6, 6 through a power transmission mechanism such as a propeller shaft 4 and a differential gear 5. Driving force of the engine 1 is transmitted to the driving wheels 6, 6 through the torque converter 2 and the automatic transmission 3.

Here, this embodiment shows, as an example, the vehicle whose drive source is only the engine 1. However, the present invention can be applied to a hybrid vehicle having the engine 1 and an electric motor (motor/generator) as the drive source, and this explanation is also applied to the hybrid vehicle.

The automatic transmission 3 is provided with a gear mechanism 33 having a plurality of pair of gears between the input shaft 31 and the output shaft 32 in a transmission casing 30. In the automatic transmission 3, the gear pairs according to a selected shift position are used, and a required shift position is achieved. That is, in the gear mechanism 33, in order to select and use the required gear pairs from the plurality of gear pairs, frictional engagement elements such as clutch and brake (both not shown) are installed. Each frictional engagement element is engaged or disengaged in accordance with the supplied oil pressure, then a target shift position is achieved by combination of engagement/disengagement of the frictional engagement elements according to the selected shift position.

In order to control the engagement/disengagement of each frictional engagement element of the gear mechanism 33, a control valve 40 that controls the supply of the oil pressure is provided.

Further, as can be seen in FIG. 1, an oil pan 50 that stores oil (ATF: Automatic Transmission Fluid, hereinafter called ATF) 51 is provided at a lower side of the transmission casing 30. The control valve 40 is installed at an upper portion of the oil pan 50, and its position is set to be higher than a fluid level of the ATF 51 stored in the oil pan 50.

A mechanical oil pump 7 is provided between the torque converter 2 and the automatic transmission 3. The mechanical oil pump 7 is connected to the pump 21 side (the input side of engine rotation) of the torque converter 2.

Upon operation of the mechanical oil pump 7, the ATF 51 stored in the oil pan 50 is pumped up by a suction force of the mechanical oil pump 7 with the ATF 51 filtered by a strainer 52, then is supplied to the control valve 40, an inside of the torque converter 2 and each elements in the automatic transmission 3 through oil passages 54a and 54b etc. as working fluid and lubricant. The ATF 51 that served as working fluid and lubricant is returned to the oil pan 50 again (see open arrows in FIG. 1).

Figure 2:
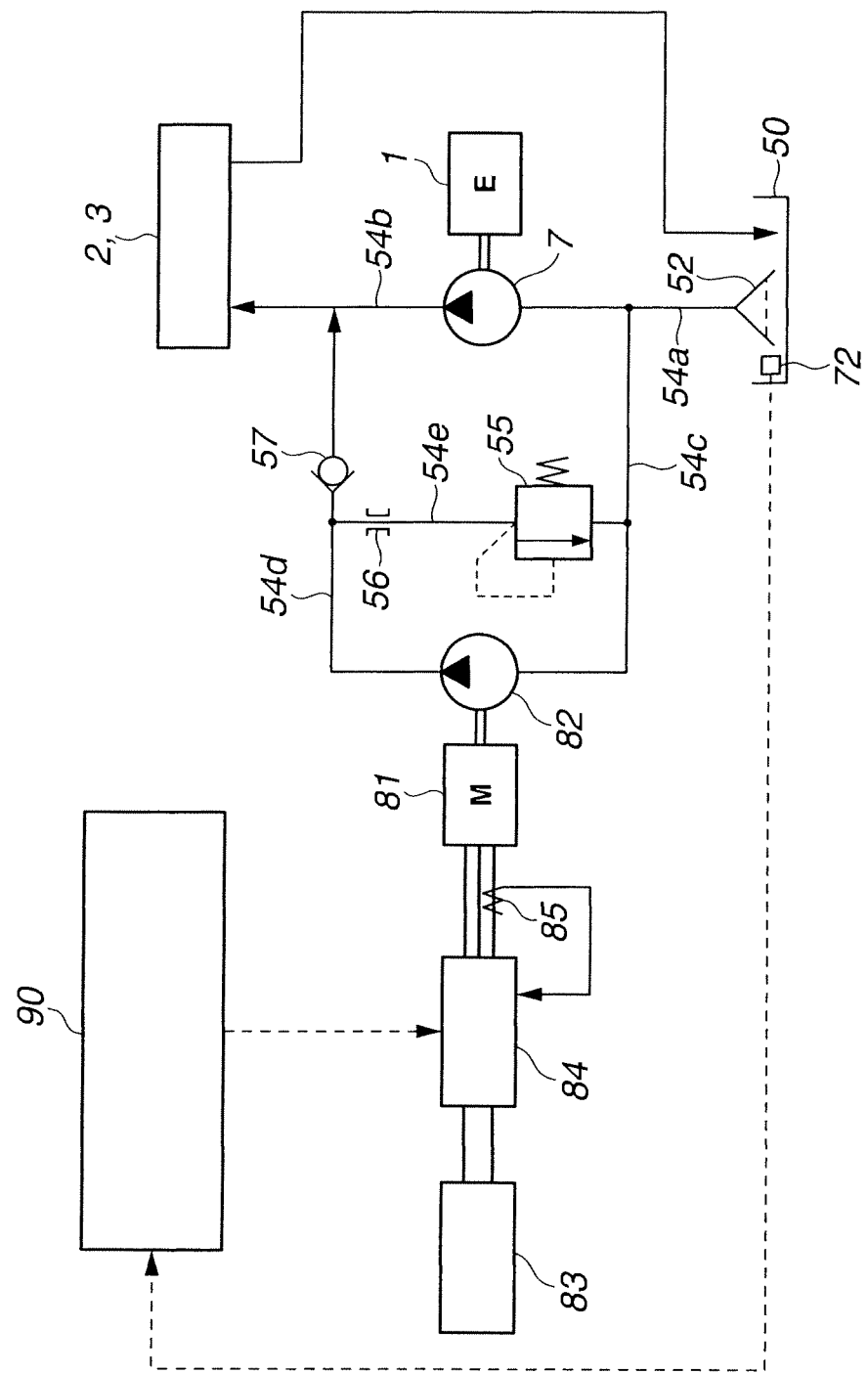
FIG. 2 is a block diagram for explaining an oil supply apparatus of the present invention.

As shown in FIGS. 1 and 2, in addition to the oil pan 50, the strainer 52 and the oil passages 54a and 54b, the present oil supply apparatus has an electric oil pump 82 that is arranged parallel to the mechanical oil pump 7 outside the automatic transmission 3 and is driven by an electric motor 81. The electric oil pump 82 pressurizes the ATF 51 required for the operation of the automatic transmission 3 instead of the mechanical oil pump 7 when the engine 1 stops.

As shown in the drawings, oil passages 54c and 54d are provided for suction/discharge of the ATF 51. The oil passage 54c branches off from the oil passages 54a connecting the strainer 52 and a suction side of the mechanical oil pump 7, and is connected to a suction side of the electric oil pump 82. As for the oil passage 54d, its one side is connected to a discharge side of the electric oil pump 82, and the other side is connected to the oil passage 54b at a discharge side of the mechanical oil pump 7. On the oil passage 54d, a check valve 57 that prevents backflow of the ATF 51 from the mechanical oil pump 7 to the electric oil pump 82 is provided.

Further, as seen in FIG. 2, between the oil passages 54c and 54d, an oil passage 54e is disposed parallel to the electric oil pump 82, and an orifice 56 and a relief valve 55 are provided on the oil passage 54e. The relief valve 55 is configured so that when oil pressure of the oil passage 54d becomes a predetermined value or higher, the relief valve 55 opens and the ATF 51 of the oil passage 54d flows to the oil passage 54c. Such a circuit, i.e. an oil circuit in which the ATF 51 discharged from the electric oil pump 82 returns to the electric oil pump 82 through the orifice 56 and the relief valve 55 on the oil passage 54e, is called a recirculation circuit.

Upon operation of the electric oil pump 82, the ATF 51 stored in the oil pan 50 is pumped up through the oil passage 54c with the ATF 51 filtered by the strainer 52, then is supplied to the inside of the torque converter 2 and each elements in the automatic transmission 3 through the oil passage 54d.

Thus, even when the engine 1 stops by the idling stop control, the required oil pressure is supplied by the electric oil pump 82. It is therefore possible to prevent a delay in rising of the oil pressure at an initial engine startup or an engine restart, then a vehicle start response delay can be avoided.

In the present embodiment, a control unit (a control device or a controller) 90 is provided to control the electric motor 81. The electric motor 81 is driven by power from a battery 83 through a pump driver 84. The control unit 90 controls this pump driver 84, namely that the control unit 90 controls the power of the battery 83 at the pump driver 84, thereby controlling the electric motor 81.

As described above, when the supply of the oil pressure from the mechanical oil pump 7 stops due to the engine stop by the idling stop control, the electric motor 81 is driven by the control unit 90 through the pump driver 84, and the ATF 51 required for working or operation of the automatic transmission 3 and the torque converter 2 is supplied from the electric oil pump 82.

As the electric motor 81, a three-phase sensorless brushless motor, which has higher efficiency than a DC brushless motor and has a simpler structure and is more inexpensive than a brushless motor with sensor, is used. However, the electric motor is not limited to this three-phase sensorless brushless motor.

The control unit 90 performs a torque control of the electric motor 81 in a normal condition. More specifically, there exists a proportional relationship between an output torque (a pump drive torque) of the electric motor 81 and a current value of current (called "winding current") passing through a stator coil (not shown) of the electric motor 81. Thus, for a torque command value from the control unit 90, the current value of the winding current is measured by a current sensor 85, and the control unit 90 performs the control through the pump driver 84 so that this measurement value becomes a predetermined value, i.e. a predetermined torque. (This control is called "torque control")

In the present invention, the control is performed using the current value as explained above. Although the control could be performed using a voltage value that is applied to the electric motor 81, in this case, the control is susceptible to change of an application source voltage and variation of resistance of a harness, and a more sophisticated control is required for achievement of accurate control. For this reason, the control in the present invention is performed using the current value.

In the case of oil such as the ATF 51, because the lower the oil temperature, the higher the oil viscosity, the pump drive torque required to drive the electric oil pump 82 becomes high. Therefore, in order to secure the required oil pressure and oil quantity, it is required that the control unit 90 should set the torque command value for the pump driver 84 in accordance with the oil temperature of the ATF 51.

In the present oil supply apparatus, as shown in FIG. 2, an oil temperature sensor 72 is provided, and this oil temperature sensor 72 detects the oil temperature of the ATF 51 stored in the oil pan 50. The detection value of the oil temperature sensor 72 is inputted to the control unit 90.

It is, of course, conceivable that the electric motor 81 is controlled so as to always output an adequate pump drive torque. However, if the output of the electric motor 81 is set to be greater than necessary, this causes waste of power. In terms of energy conservation or fuel conservation, power-conservation operation is necessary.

Thus, in order to secure a minimum oil pressure required to maintain the working of the automatic transmission 3 all the time in the engine stop state, the control of the electric motor 81 is performed by pump drive torque according to the oil temperature of the ATF 51 without excess and deficiency of the pump drive torque. In the normal condition, to realize this control, the control unit 90 sets the pump drive torque corresponding to the detection value of the oil temperature sensor 72 and outputs the torque command value to the pump driver 84 so that the electric motor 81 outputs the set pump drive torque.

Further, in terms of the power-conservation operation, when the required oil pressure is secured by the mechanical oil pump 7, the electric motor 81 is brought in a stop state.

Here, although the electric oil pump 82 is provided outside the automatic transmission 3, the electric oil pump 82 is not necessarily arranged extremely close to the oil pan 50. That is, in many cases, it is difficult to make space for the electric oil pump 82 and the electric motor 81 at the extremely close position to the oil pan 50, then the electric oil pump 82 is arranged widely apart from the oil pan 50. The present embodiment also addresses the case where the electric oil pump 82 is widely separated from the oil pan 50.

In this case, in a state in which the required oil pressure can be secured by the mechanical oil pump 7, the electric motor 81 is in the stop state. Thus, almost no oil (no ATF 51) in the oil pan 50 circulates to main parts of the oil passages 54c and 54d connecting to the electric oil pump 82 and to the electric oil pump 82. Because of this, there may arise a difference in the oil temperature between the ATF 51 in the electric oil pump 82 and the ATF 51 stored in the oil pan 50 with the ATF 51 in the electric oil pump 82 being affected by an ambient temperature of the electric oil pump 82. For example, in a frigid area, the oil temperature of the ATF 51 in the electric oil pump 82 considerably decreases as compared with the oil temperature of the ATF 51 stored in the oil pan 50, then the large oil temperature difference arises between the both ATFs 51. Especially when the electric oil pump 82 is widely separated from the oil pan 50 and pipes of the oil passages 54c and 54d are arranged outside the automatic transmission 3, this oil temperature difference becomes extremely large.

However, in a case where the electric oil pump 82 is restarted without a waiting time after the stop of the electric oil pump 82, also in a case where the mechanical oil pump 7 worked just before the start of the electric oil pump 82, the oil temperature of the ATF 51 in the electric oil pump 82 does not become the extremely low temperature state through heat conduction of the oil itself and the pipes of the oil passages 54c and 54d. The above extremely large oil temperature difference therefore does not arise.

Since it is impossible to directly get or ascertain the oil temperature of the ATF 51 in the electric oil pump 82 by the oil temperature sensor 72 provided in the oil pan 50, there is a need to estimate the above oil temperature difference.

As circumstances in which the difference between the oil temperature of the ATF 51 of the electric oil pump 82 and the oil temperature of the ATF 51 of the oil pan 50 which is detected by the oil temperature sensor 72 becomes extremely large, for instance, it is a case where the vehicle stops for some time in the frigid area etc. and a temperature $T_{ATF}$ of the oil temperature of the ATF 51 stored in the oil pan 50 detected by the oil temperature sensor 72 becomes a reference value (a threshold value) $T_{ATF0}$ or less. Under such circumstances, since the ATF 51 of the electric oil pump 82 is susceptible to an outside air temperature as compared with the ATF 51 in the oil pan 50, it can be estimated that the oil temperature of the ATF 51 of the electric oil pump 82 considerably decreases and the both oil temperatures become quite different.

Thus, in the present oil supply apparatus, when the detection oil temperature $T_{ATF}$ of the oil temperature sensor 72 is the reference value (a predetermined setting temperature) $T_{ATF0}$ or less, it is judged that the oil temperature of the ATF 51 of the electric oil pump 82 is quite different from the detection oil temperature of the oil temperature sensor 72.

In the case where the oil temperature of the ATF 51 of the electric oil pump 82 is judged to be quite different from the detection oil temperature of the oil temperature sensor 72, a torque shortage of the electric motor 81 occurs in the operation by the torque command value according to the detection oil temperature. This makes it impossible to start the electric motor 81, also this causes loss of synchronism of the electric motor 81 depending on control manner, then the proper control can not be carried out.

However, at this time, the control unit 90 controls the electric motor 81 so that the electric motor 81 outputs the pump drive torque that is necessary for the electric oil pump 82 to be able to start even though the oil temperature of the ATF 51 of the electric oil pump 82 is extremely low. (This control is called "oil temperature difference-presence control" or "oil temperature difference-existing control")

As a way of outputting the pump drive torque that is necessary for the start of the electric oil pump 82 by the electric motor 81 even though the oil temperature of the ATF 51 is extremely low, the following controls can be employed; performing a rotation speed control of the electric motor 81 so as to rotate at a predetermined rotation speed which is set to be lower than a rotation speed of the case where the electric motor 81 rotates by the drive torque value according to the detection oil temperature $T_{ATF}$, performing a rotation speed control of the electric motor 81 so as to rotate at a rate of rise of rotation speed which is lower than a rate of rise of rotation speed of the case where the electric motor 81 rotates by the drive torque value according to the detection oil temperature $T_{ATF}$, and performing an open loop control of the electric motor 81 by a predetermined drive torque value that can start the electric oil pump 82 even at the extremely low oil temperature.

Further, in this oil temperature difference-presence control, when the electric oil pump 82 operates and the ATF 51 in the electric oil pump 82 and the ATF 51 in the oil pan 50 etc. are interchanged by an about one time circulation (or an about one round circulation) of the ATF 51 in the oil circuit, the difference between the oil temperature of the ATF 51 of the electric oil pump 82 and the detection oil temperature of the oil temperature sensor 72 disappears or becomes small to such an extent that the control is unaffected by the difference.

Thus, a time $t_0$, which is required to achieve the about one round circulation of the ATF 51 in the oil circuit after the electric oil pump 82 operates, is previously set. Then when the oil temperature difference-presence control continues for this setting time $t_0$, the control unit 90 changes the control to the normal control. That is, the control unit 90 changes the control to an "oil temperature-response torque control" that sets the pump drive torque corresponding to the detection value of the oil temperature sensor 72 and outputs the torque command value to the pump driver 84 so that the electric motor 81 outputs the set pump drive torque.

Figure 3:
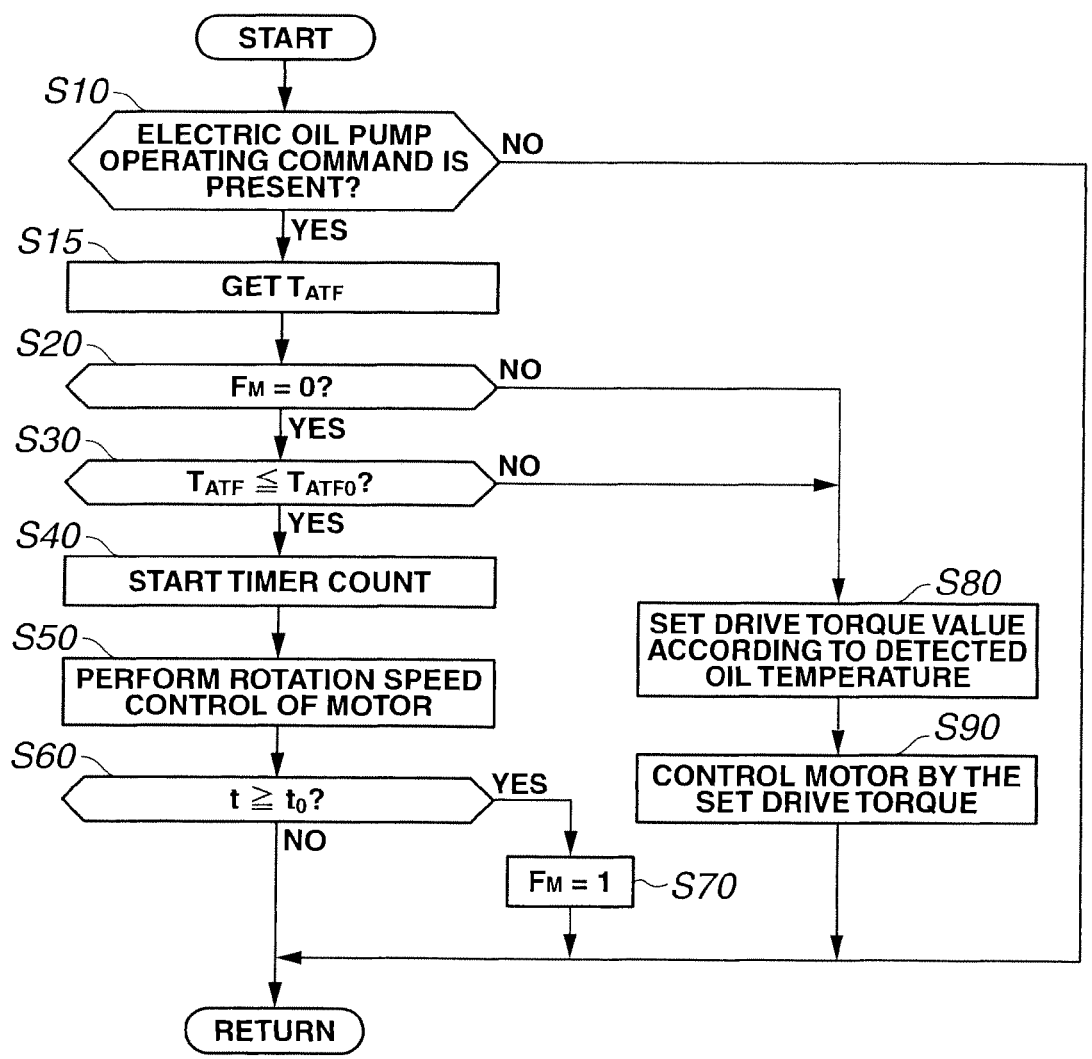
FIG. 3 is a flow chart of a control of the vehicle.

The present oil supply apparatus for the transmission is configured to perform the above controls. For example, at the start of the electric oil pump 82, a control as shown by a flow chart in FIG. 3 is executed. The flow in FIG. 3 is carried out at a predetermined cycle period. Further, a flag $F_M$ is set to "1" when the oil temperature-response torque control is in operation, while the flag $F_M$ is reset to "0" in a case except the oil temperature-response torque control.

As shown in FIG. 3, at step S10, a judgment is made as to whether or not an operating command of the electric oil pump 82 is present. If NO (there is no operating command), this process ends (the routine proceeds to RETURN) without execution of the operation control of the electric oil pump 82. If YES (the operating command of the electric oil pump 82 is present), the control unit 90 inputs or gets the detection oil temperature $T_{ATF}$ of the oil temperature sensor 72 (at step S15).

Next, at step S20, a judgment is made as to whether or not the flag $F_M$ is 0. Since the flag $F_M$ is 0 at a time of a start command of the electric oil pump 82 at which the operating command of the electric oil pump 82 is started, the routine proceeds to step S30, and a judgment is made as to whether or not the detection oil temperature $T_{ATF}$ is lower than or equal to the reference value $T_{ATF0}$. If YES (the detection oil temperature $T_{ATF}$ is the reference value $T_{ATF0}$ or lower), a timer starts counting (at step S40) and also the control unit 90 controls the electric motor 81 at the predetermined rotation speed (at step S50). That is, the control unit 90 controls the electric motor 81 so that the electric motor 81 outputs the pump drive torque that is necessary for the electric oil pump 82 to be able to start even if the oil temperature of the ATF 51 of the electric oil pump 82 is extremely low (the oil temperature difference-presence control, step S50).

Subsequently, at step S60, a judgment is made as to whether or not a timer count value t reaches the setting time $t_0$. Here, as long as the detection oil temperature $T_{ATF}$ is the reference value $T_{ATF0}$ or lower, the oil temperature difference-presence control (step S50) is executed until the timer count value t reaches the setting time $t_0$. When the timer count value t reaches the setting time $t_0$, the flag $F_M$ is set to "1" (at step S70).

When the detection oil temperature $T_{ATF}$ is higher than the reference value $T_{ATF0}$ (at step S30) or when the flag $F_M$ is set to "1" (at step S70 and "NO" at step S20), the control unit 90 sets the pump drive torque corresponding to the detection value of the oil temperature sensor 72 (the oil temperature-response torque control, step S80), and the control unit 90 controls the electric motor 81 so that the electric motor 81 outputs the set pump drive torque by outputting the torque command value to the pump driver 84 (the oil temperature-response torque control, step S90).

As described above, in the case where it is estimated that the oil temperature of the ATF 51 of the electric oil pump 82 considerably decreases and the oil temperature of the ATF 51 of the electric oil pump 82 and the detection oil temperature $T_{ATF}$ of the oil temperature sensor 72 in the oil pan 50 are quite different, even if the oil temperature of the ATF 51 of the electric oil pump 82 is the extremely low temperature, the electric motor 81 is controlled to output the pump drive torque that is necessary for the electric oil pump 82 to be able to start. It is consequently possible to prevent such occurrences that the electric motor 81 can not be started due to the torque shortage of the electric motor 81 and the proper control can not be carried out due to the loss of synchronism of the electric motor 81 depending on control manner.

Figure 4:
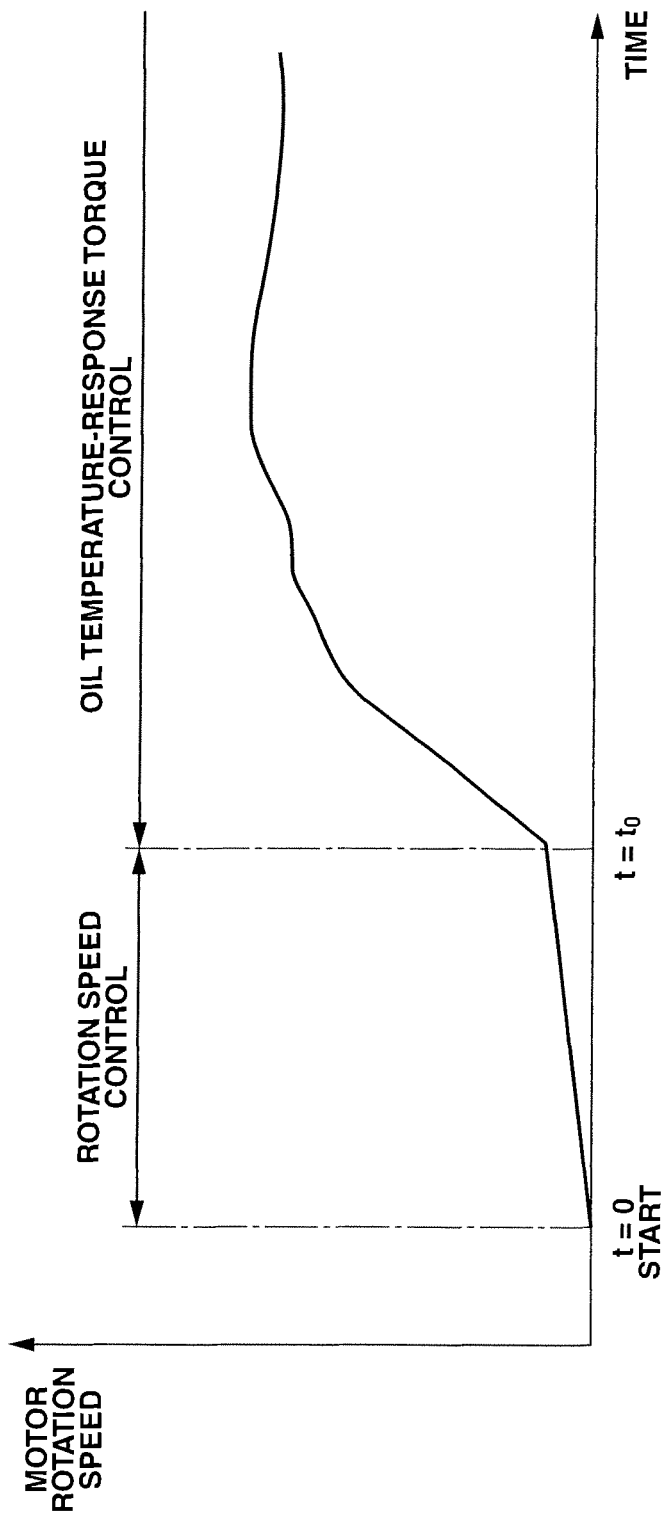
FIG. 4 is a time chart for explaining an oil supply characteristic.

Further, when the timer count value t reaches the setting time $t_0$, namely that when the electric oil pump 82 operates and the ATF 51 in the electric oil pump 82 and the ATF 51 in the oil pan 50 etc. are interchanged by the about one round circulation of the ATF 51 in the oil circuit, the control unit 90 terminates the oil temperature difference-presence control and changes the control to the power-conservation operation by the oil temperature-response torque control (see FIG. 4). Hence, effects of the energy conservation and the fuel conservation can be secured.

Figure 5:
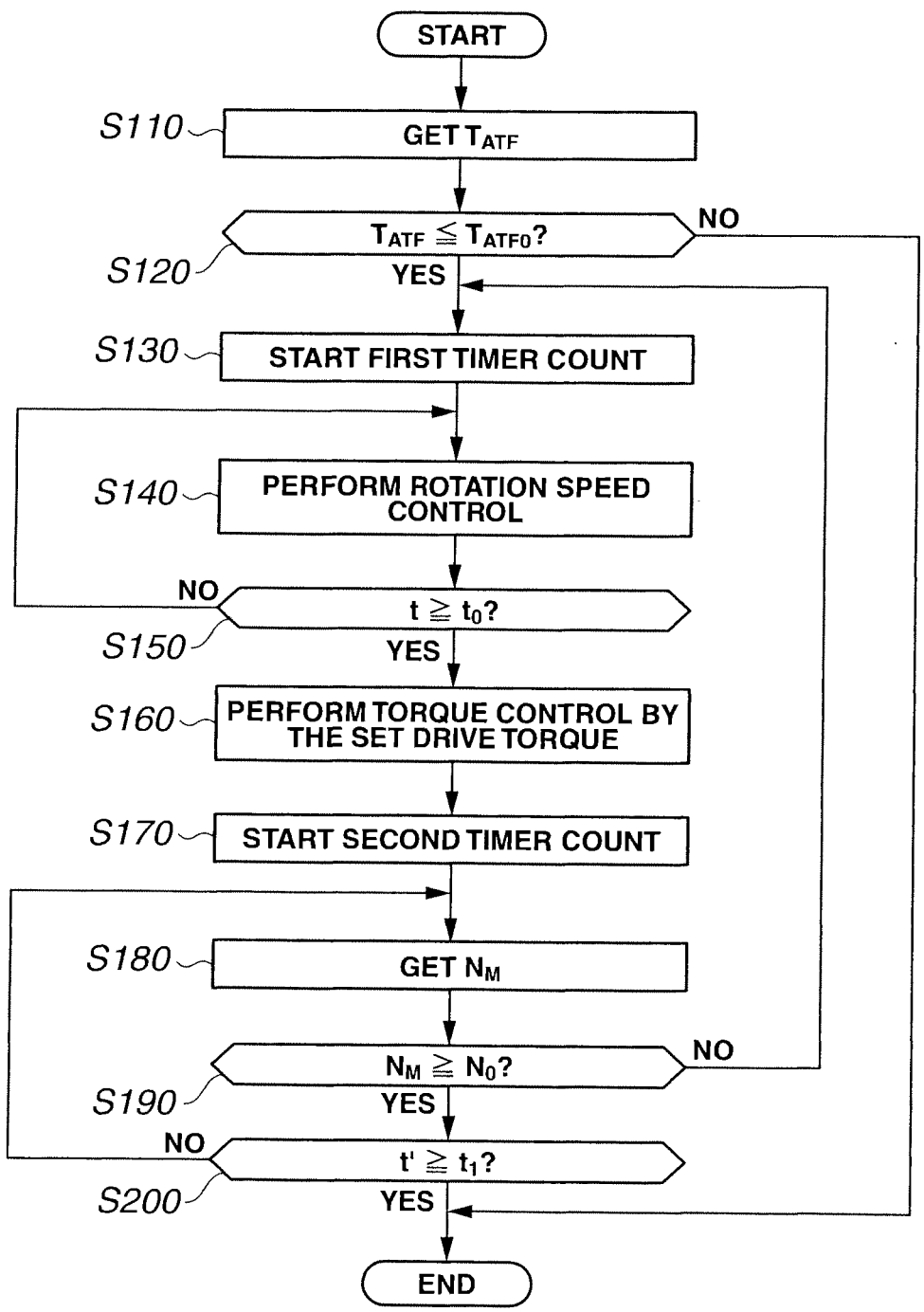
FIG. 5 is a flow chart of a control of the vehicle.

The oil supply apparatus for the transmission according to the present embodiment can also execute a control as shown by a flow chart in FIG. 5. The flow chart in FIG. 5 is a control that is carried out as an engine warm-up upon an ON-operation of an ignition key by a driver.

When the ON-operation of the ignition key is done by the driver, the flow shown in FIG. 5 starts. First, at step S110, the control unit 90 inputs or gets the detection oil temperature $T_{ATF}$ of the oil temperature sensor 72. Next, a judgment is made as to whether or not the detection oil temperature $T_{ATF}$ is lower than or equal to the reference value $T_{ATF0}$ (at step S120). If YES (the detection oil temperature $T_{ATF}$ is the reference value $T_{ATF0}$ or lower), a first timer starts counting (at step S130) and also the control unit 90 controls the electric motor 81 at the predetermined rotation speed (at step S140). The rotation speed control of this step S140 is the control that performs the rotation speed control of the electric motor 81 at the low rotation speed so that the electric oil pump 82 can start even if the oil temperature of the ATF 51 of the electric oil pump 82 is extremely low then lessens a load torque (i.e. the oil temperature difference-presence control).

Subsequently, at step S150, a judgment is made as to whether or not a first timer count value t reaches the setting time $t_0$. Here, as long as the detection oil temperature $T_{ATF}$ is the reference value $T_{ATF0}$ or lower, the oil temperature difference-presence control (step S140) is executed until the first timer count value t reaches the setting time $t_0$. When the first timer count value t reaches the setting time $t_0$, the control unit 90 performs the torque control of the electric motor 81 with the drive torque set to a maximum torque of the electric motor 81 (at step S160).

When the torque control of the electric motor 81 starts in this way, a second timer start counting (at step 170), and the control unit 90 inputs or gets detection information of a rotation speed $N_M$ of the electric motor 81 (step S180).

At step S190, a judgment is made as to whether or not the detected rotation speed $N_M$ of the electric motor 81 is greater than or equal to a predetermined reference rotation speed $N_0$. If YES (the detected rotation speed $N_M$ of the electric motor 81 is the predetermined reference rotation speed $N_0$ or greater), the routine proceeds to step S200.

At step S200, a judgment is made as to whether or not a second timer count value t' reaches a predetermined second setting time $t_1$. Here, as long as the rotation speed $N_M$ of the electric motor 81 is the reference rotation speed $N_0$ or greater, the torque control (step S160) is executed until the second timer count value t' reaches the second setting time $t_1$. When the second timer count value t' reaches the second setting time $t_1$, the control unit 90 terminates the engine warm-up control.

On the other hand, the rotation speed $N_M$ of the electric motor 81 is less than the reference rotation speed $N_0$ before the second timer count value t' reaches the second setting time $t_1$, the routine returns to step S130 from step S190, and the rotation speed control of the electric motor 81 (the oil temperature difference-presence control, step S140) is executed.

In this manner, in the control shown in FIG. 5, the torque control of the electric motor 81 is performed after executing the rotation speed control of the electric motor 81, then it is checked whether the electric motor 81 rotates (whether the rotation speed $N_M$ of the electric motor 81 is able to be the reference rotation speed $N_0$ or greater) by the torque control, thereby reducing possibility that the loss of synchronism of the electric motor 81 occurs when the normal control is performed after the engine warm-up operation.

Furthermore, it is also possible to combine the control of the engine warm-up shown by the flow chart shown in FIG. 5 and the control shown by the flow chart shown in FIG. 3. In this case, the checking process by the torque control from step S160 in the flow chart in FIG. 5 could be omitted. In the case where the torque control is omitted, after the rotation speed control (step S140) is performed and the first timer count value t reaches the setting time $t_0$, step at which the flag $F_M$ is set to "1" is added. In this way, by adding the step at which the flag $F_M$ is set to "1", the control is instantly or immediately shifted to the torque control after performing the engine warm-up operation also in the flow chart in FIG. 3, it is therefore possible to prevent repetition of the rotation speed control (the oil temperature difference-presence control).

Although the present invention has been explained on the basis of the above embodiment, the present invention is not limited to the embodiment.

In the above embodiment, in the rotation speed control (the oil temperature difference-presence control), by setting the rotation speed of the electric motor 81 to the lower speed, an output value of the pump drive torque is increased. However, in addition to such control, it could be possible to limit an increase of the rotation speed of the electric motor 81. For instance, as shown in FIG. 4, during the execution of the rotation speed control, the rotation speed of the electric motor 81 is controlled so that the rotation speed increases at a substantially constant gradient with respect to time, in order that the rotation speed of the electric motor 81 does not suddenly increases. With such control, an increase in the load torque of the electric motor 81 can be further reduced.

Next, effects of the present invention will be explained.

According to the oil supply apparatus for the transmission of the present invention, when the controller judges that there is a possibility that the detection oil temperature of the oil temperature sensor and the temperature of the oil close to the oil pump are different at the electric motor starting, first the controller controls the electric motor so as to output the greater drive torque than the drive torque that is set according to the detection oil temperature, and subsequently controls the electric motor so as to output the drive torque according to the detection oil temperature.

In the case where the detection oil temperature and the oil temperature close to the oil pump are different, also especially when the oil temperature close to the oil pump is extremely low as compared with the detection oil temperature, the controller performs the oil temperature difference-presence control in which the electric motor outputs the greater drive torque than the drive torque according to the detection oil temperature. With this control, it is possible to surely start the electric motor with the output torque of the electric motor overcoming or exceeding viscous drag (viscous resistance) of the oil. In addition, a required discharge pressure can be secured immediately without causing loss of synchronism of the electric motor, then the oil pressure required for the operation of the transmission can be obtained.

When the detection oil temperature is the predetermined setting temperature or lower, the controller judges that the detection oil temperature and the oil temperature close to the oil pump are different. In this judging manner, the case where the oil temperature close to the oil pump is extremely low as compared with the detection oil temperature, which is regarded as the problem in the present invention, can be easily judged.

As the oil temperature difference-presence control, the rotation speed control of the electric motor is performed so that the electric motor rotates at the lower rotation speed than the rotation speed of the case where the electric motor rotates by the drive torque value according to the detection oil temperature. With this control, it is possible to lessen the load torque of the electric motor, and the loss of synchronism of the electric motor can be prevented.

Further, as the oil temperature difference-presence control, the rotation speed control of the electric motor could be performed so that the electric motor rotates at the lower rate of rise of rotation speed than the rate of rise of rotation speed of the case where the electric motor rotates by the drive torque value according to the detection oil temperature. With this control, during transition from a state in which the rotation of the electric motor stops to a state in which the electric motor rotation becomes high, it is possible to lessen the load torque of the electric motor, and the loss of synchronism of the electric motor can be prevented.

Furthermore, as the oil temperature difference-presence control, the open loop control of the electric motor could be performed by the predetermined drive torque value that can start the oil pump even at the extremely low predetermined oil temperature. With this control, when the oil temperature close to the oil pump is extremely low, it is possible to further surely start the electric motor.

Moreover, the oil temperature difference-presence control could be performed only for a time period of the one round circulation of the oil in the oil circuit after the oil pump starts operating. The difference between the detection oil temperature and the oil temperature close to the oil pump disappears by the one round circulation of the oil, and the control can be instantly or immediately shifted to the torque control that controls the electric motor so as to output the drive torque according to the detection oil temperature, then the proper torque control of the electric motor can be achieved.

The entire contents of Japanese Patent Application No. 2010-203709 filed on Sep. 10, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An oil supply apparatus for a transmission comprising:
an electric motor;
an oil pump configured to be driven by the electric motor and to supply oil to the transmission, the oil pump being provided outside the transmission;
an oil temperature sensor configured to detect a detection oil temperature, the oil temperature sensor being separated from the oil pump so as to permit a difference between the detection oil temperature detected by the oil temperature sensor and an oil temperature close to the oil pump to arise; and
a controller configured to
set a drive torque value and to control the electric motor so that the electric motor outputs a drive torque according to the detection oil temperature detected by the oil temperature sensor,
judge whether the detection oil temperature differs from the oil temperature of the oil close to oil pump at a start of the electric motor by comparing the detection oil temperature to a predetermined reference temperature,
determine that the detection oil temperature differs from the oil temperature of the oil close to oil pump at the start of the electric motor when the detection oil temperature is equal to or lower than the predetermined reference temperature, and
upon determination that the detection oil temperature and the oil temperature of the oil close to the oil pump differ at the start of the electric motor, control the electric motor with an oil temperature difference-presence control such that the electric motor rotates at a rotation speed so as to permit a start of the oil pump and which is lower than a rotation speed when the electric motor rotates by a drive torque value according to the detection oil temperature before performing control of the electric motor by which the electric motor outputs the drive torque according to the detection oil temperature.

2. The oil supply apparatus for the transmission as claimed in claim 1,
wherein when the controller judges that the detection oil temperature and the oil temperature close to the oil pump differ, the controller is configured to perform, as the oil temperature difference-presence control, a rotation speed control of the electric motor so that the electric motor rotates at a lower rate of rise of rotation speed than a rate of rise of rotation speed when the electric motor rotates by the drive torque value according to the detection oil temperature.

3. The oil supply apparatus for the transmission as claimed in claim 1,
wherein when the controller judges that the detection oil temperature and the oil temperature close to the oil pump differ, the controller is configured to perform, as the oil temperature difference-presence control, an open loop control of the electric motor by a predetermined drive torque value such that the oil pump can be started even at an extremely low predetermined oil temperature.

4. The oil supply apparatus for the transmission as claimed in claim 1,
wherein the controller is configured to perform the oil temperature difference-presence control only for a time period of one round of circulation of the oil in an oil circuit after the oil pump starts operating.

5. A method for controlling oil supply to a transmission in a vehicle, the vehicle comprising:
the transmission,
an electric motor,
an oil pump configured to be driven by the electric motor and to supply oil to the transmission, the oil pump being provided outside the transmission,
an oil temperature sensor configured to detect a detection oil temperature of the oil, the oil temperature sensor being separated from the oil pump so as to permit a difference between the detection oil temperature detected by the oil temperature sensor and an oil temperature close to the oil pump to arise,
the method comprising performing, by a controller:
setting a drive torque value and controlling the electric motor so that the electric motor outputs a drive torque according to the detection oil temperature detected by the oil temperature sensor,
judging whether the detection oil temperature differs from the oil temperature close to the oil pump at a start of the electric motor by comparing the detection oil temperature to a predetermined reference temperature,
determining that the detection oil temperature differs from the oil temperature of the oil close to oil pump at the start of the electric motor when the detection oil temperature is equal to or lower than the predetermined reference temperature, and
upon determination that the detection oil temperature and the oil temperature of the oil close to the oil pump differ at the start of the electric motor, controlling the electric motor such that the electric motor rotates at a rotation speed so as to permit the oil pump to start and which is lower than a rotation speed when the electric motor rotates by a drive torque value according to the detection oil temperature before controlling the electric motor such that the electric motor outputs the drive torque according to the detection oil temperature.

6. The oil supply apparatus of claim 1, wherein the controller is further configured to:
upon determination that the detection oil temperature exceeds the predetermined reference temperature, control the electric motor such that the electric motor rotates by the drive torque value and outputs the drive torque according to the detection oil temperature.

7. The method for controlling oil supply of claim 5, further comprising:
upon determination that the detection oil temperature exceeds the predetermined reference temperature, controlling the electric motor such that the electric motor rotates by the drive torque value and outputs the drive torque according to the detection oil temperature.

* * * * *